US009030683B2

(12) United States Patent
Osawa

(10) Patent No.: US 9,030,683 B2
(45) Date of Patent: May 12, 2015

(54) INFORMATION PROCESSING APPARATUS, CONTROL METHOD, AND STORAGE MEDIUM WITH DELETION UNIT DELETING A VIRTUAL DEVICE OBJECT

(71) Applicant: Canon Kabushiki Kaisha, Tokyo (JP)

(72) Inventor: Shunsuke Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 13/773,420

(22) Filed: Feb. 21, 2013

(65) Prior Publication Data
US 2013/0222832 A1 Aug. 29, 2013

(30) Foreign Application Priority Data
Feb. 24, 2012 (JP) .................................. 2012-038882

(51) Int. Cl.
*G06F 3/12* (2006.01)
(52) U.S. Cl.
CPC ............ *G06F 3/1296* (2013.01); *G06F 3/1204* (2013.01); *G06F 3/1257* (2013.01); *G06F 3/127* (2013.01); *G06F 3/1286* (2013.01)

(58) Field of Classification Search
USPC .................................................. 358/1.13, 1.1
See application file for complete search history.

(56) References Cited

U.S. PATENT DOCUMENTS

2011/0041091 A1* 2/2011 Sato et al. ..................... 715/772

FOREIGN PATENT DOCUMENTS

| EP | 2629192 A2 | 8/2013 |
|---|---|---|
| JP | 11-334180 A | 12/1999 |
| JP | 2007-286700 A | 11/2007 |
| JP | 2008-52705 A | 3/2008 |
| JP | 2010-170533 A | 8/2010 |
| JP | 2011-18309 A | 1/2011 |

* cited by examiner

*Primary Examiner* — Martin Mushambo
(74) *Attorney, Agent, or Firm* — Canon U.S.A., Inc. IP Division

(57) ABSTRACT

An information processing apparatus performs, when an instruction is received on a gadget from a user and a printer object allocated to the gadget exists, processing using a printer driver allocated to the printer object, and displays, when an instruction is received on the gadget from the user and the printer object allocated to the gadget does not exist, a setting screen for the gadget.

22 Claims, 18 Drawing Sheets

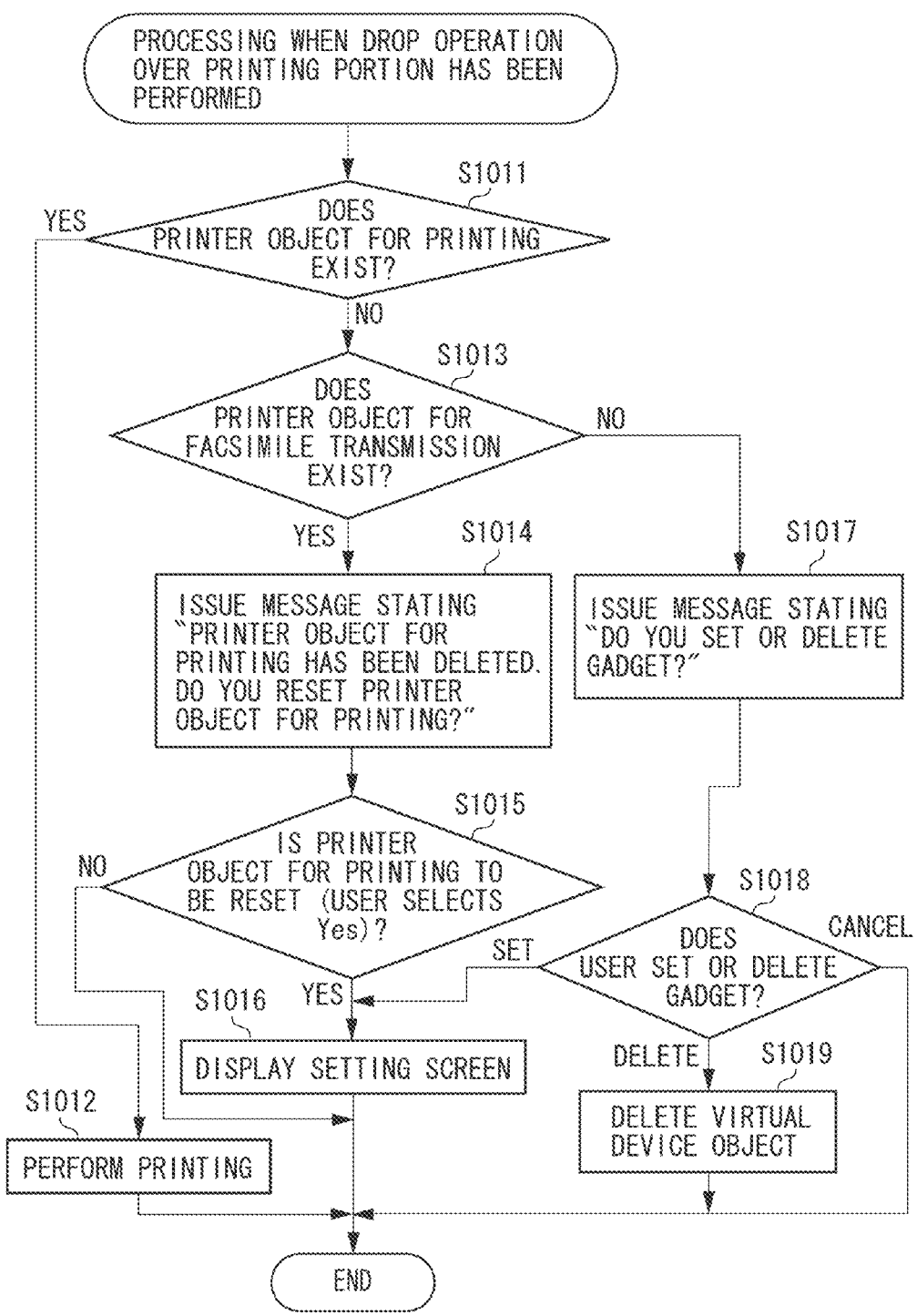

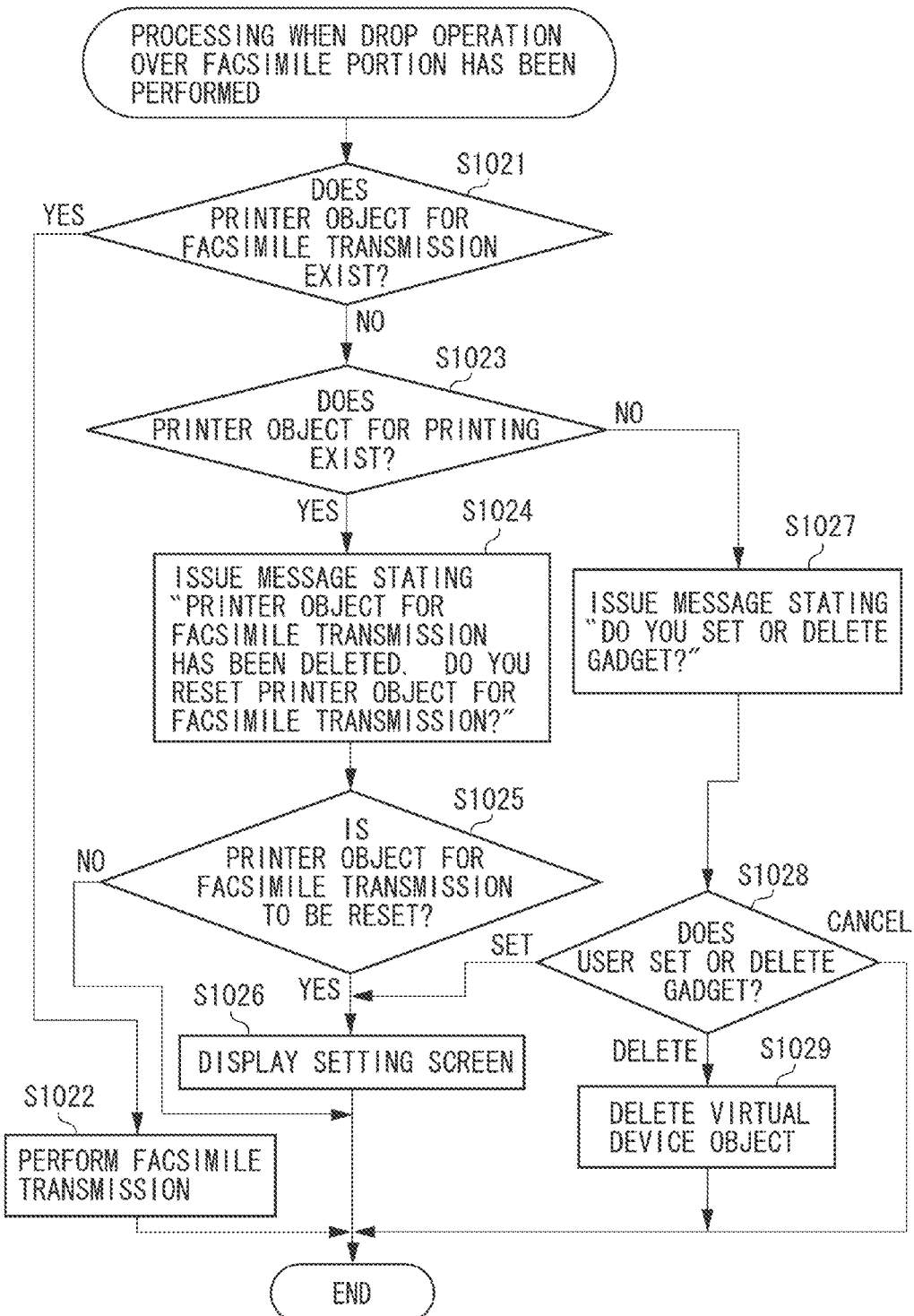

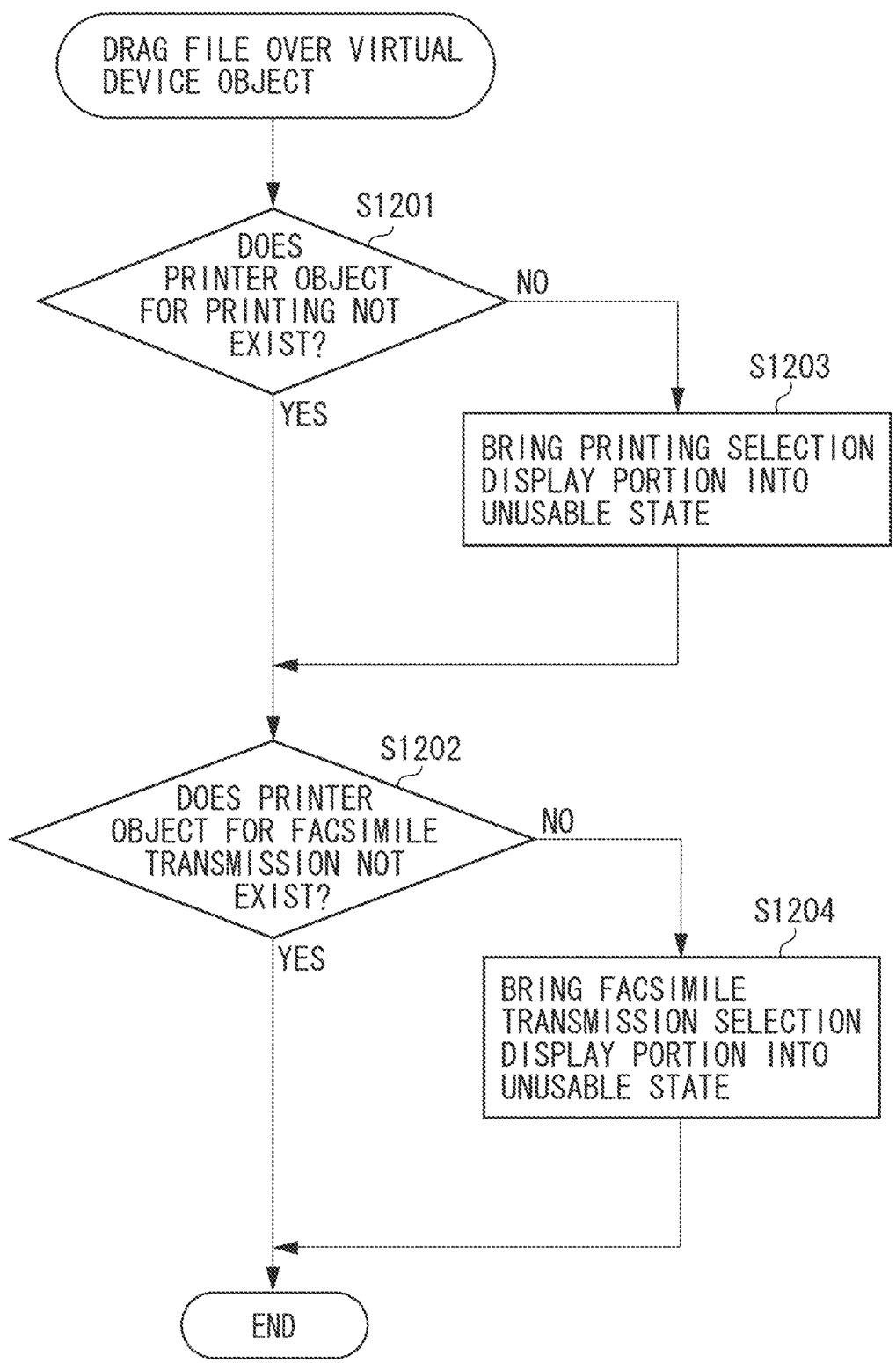

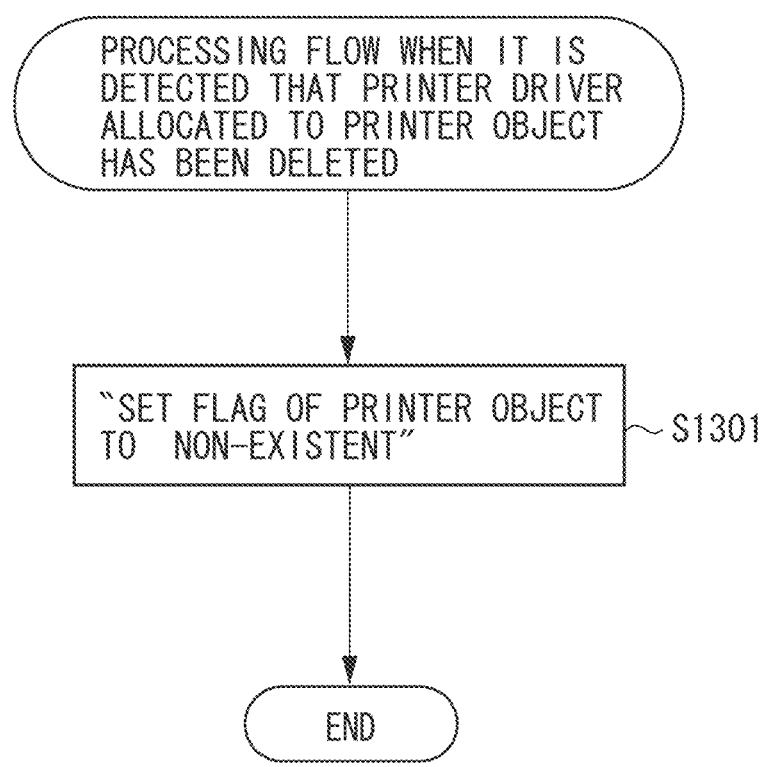

_US 9,030,683 B2_

INFORMATION PROCESSING APPARATUS, CONTROL METHOD, AND STORAGE MEDIUM WITH DELETION UNIT DELETING A VIRTUAL DEVICE OBJECT

BACKGROUND OF THE INVENTION

1. Field of the Invention

The present invention relates to a technique concerning a gadget for performing processing using a printer driver.

2. Description of the Related Art

A gadget is an object displayed on a screen of a personal computer (PC) or a mobile device. The gadget is generally used to provide a function frequently used to be easily accessible and to transmit visual information.

Japanese Patent Application Laid-Open No. 2010-170533 discusses a technique for performing processing when a widget (corresponding to a gadget and a virtual device object in the present specification) is deleted.

However, Japanese Patent Application Laid-Open No. 2010-170533 neither discusses allocating a printer object to the widget to associate them, nor naturally considering a case where the printer object allocated to the widget has been deleted. Accordingly, regardless of the printer object allocated to the widget being deleted, the widget may receive an instruction including processing performed by a printer driver allocated to the deleted printer object from a user.

SUMMARY OF THE INVENTION

The present invention is directed to an information processing apparatus capable of improving the operability of a gadget.

According to an aspect of the present invention, an information processing apparatus includes an allocation unit configured to allocate a first printer object and a second printer object to a device object for receiving an instruction to execute a first function and an instruction to execute a second function, an instruction unit configured to issue, when the instruction to execute the first function is received from a user and the first printer object exists, an instruction to perform output using a printer driver allocated to the first printer object, and to issue, when the instruction to execute the second function is received from the user and the second printer object exists, an instruction to perform output using a printer driver allocated to the second printer object, and a deletion unit configured to delete the device object when the first printer object and the second printer object do not exist.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A, 10B, and 10C are flowcharts of processing performed when a virtual device object has received a drop operation.

FIG. 12 is a flowchart of processing when it is determined whether a virtual device object can be executed.

FIG. 13 is a flowchart of processing performed when it is detected that a printer driver allocated to a printer object has been deleted.

DESCRIPTION OF THE EMBODIMENTS

Various exemplary embodiments, features, and aspects of the invention will be described in detail below with reference to the drawings.

Figure 1:
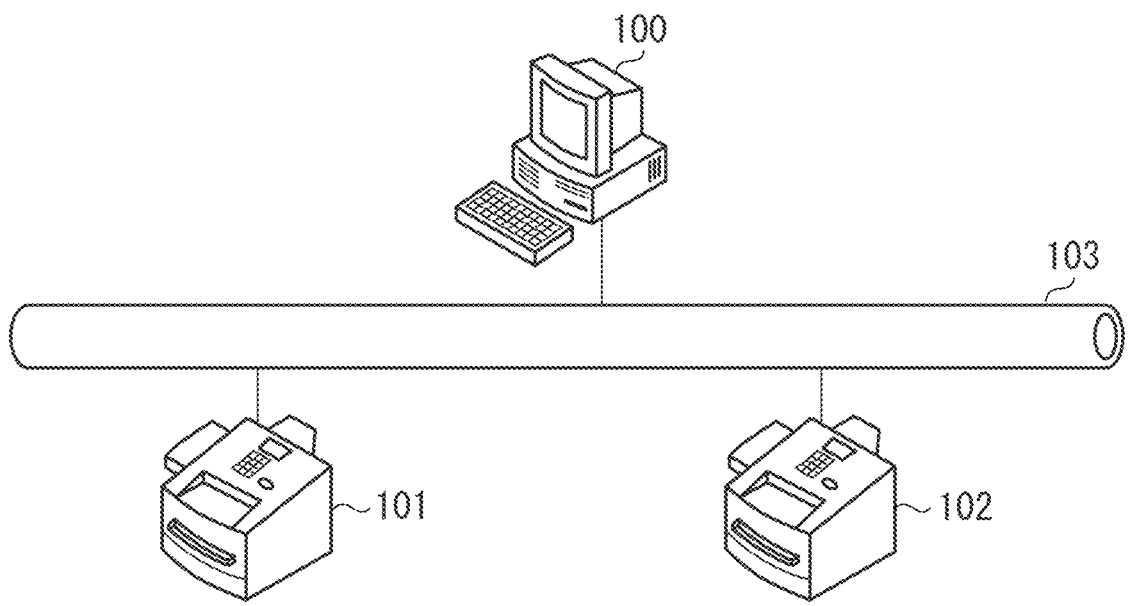
FIG. 1 illustrates a configuration of a data processing system according to an exemplary embodiment of the present invention.

FIG. 1 illustrates a configuration of a data processing system according to a first exemplary embodiment of the present invention. This example illustrates a system in which an information processing apparatus and an image processing apparatus can communicate with each other via a network. In FIG. 1, an information processing apparatus 100 is a computer usable by a user who instructs image processing apparatuses 101 and 102 to perform printing and facsimile transmission. Each of the image processing apparatuses 101 and 102 is a multifunction peripheral (MFP), and has a printer function, a facsimile function, a copy function, a scanner function, and a file sending function. A predetermined operating system (OS) is installed on the information processing apparatus 100, and various types of applications for executing specified functional processing are also installed thereon. The specified functional processing includes document processing, spreadsheet processing, presentation processing, image processing, and graphics processing. Each of the applications has its own data structure (file structure).

Further, the OS can refer to an identifier of each file to issue a printing instruction to the corresponding application. A virtual device application 400 for using each of the image processing apparatus 101 and 102 is installed on the information processing apparatus 100 according to the present exemplary embodiment. The virtual device application 400 has a function of issuing an output instruction such as a printing instruction and a facsimile transmission instruction to the image processing apparatus and a function of displaying a use status of the image processing apparatus and an execution status of an output job. The information processing apparatus 100 and the image processing apparatuses 101 and 102 are connected to a local area network (LAN) 103, and perform mutual communication of information via the LAN 103.

Figure 2:
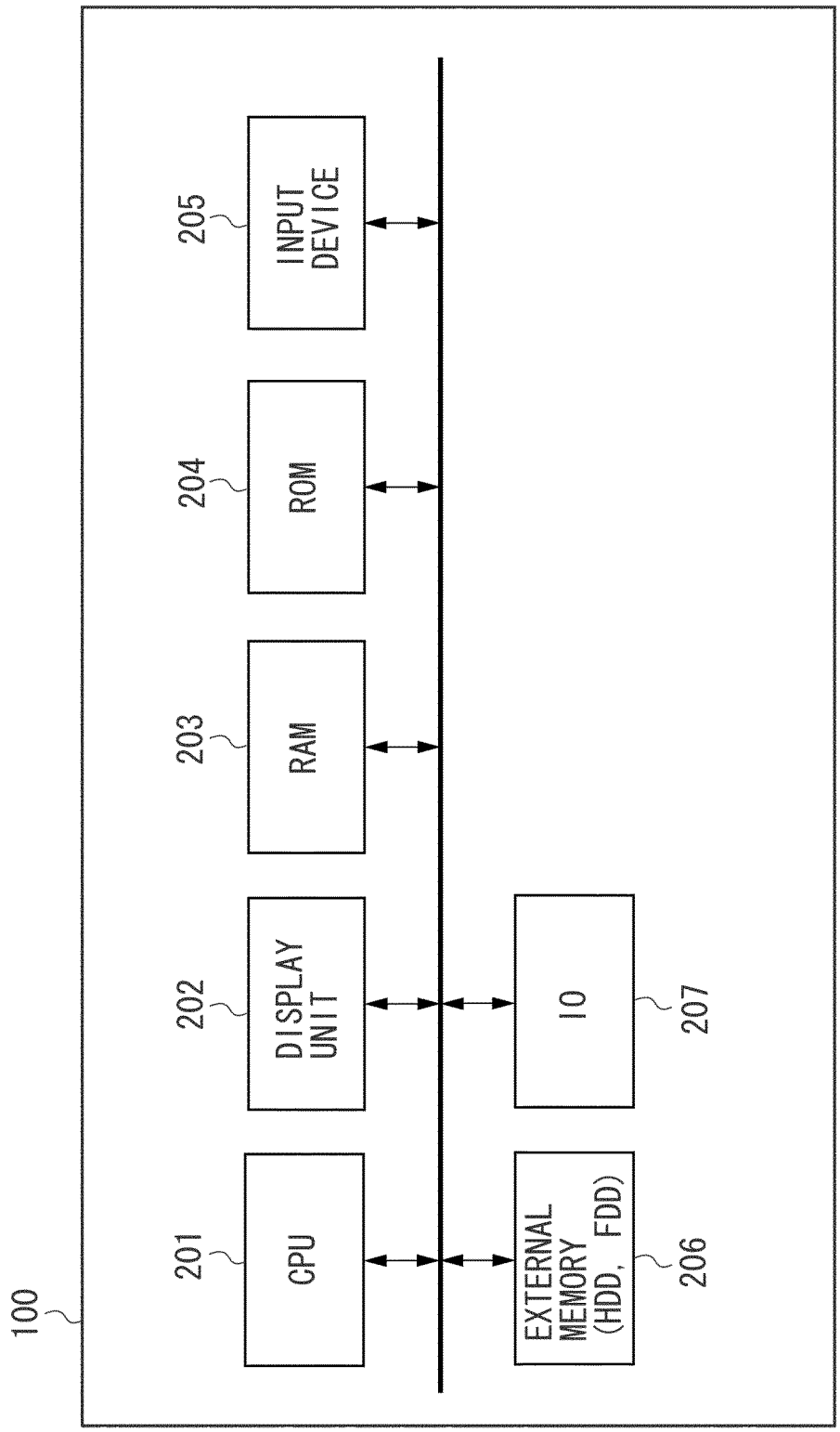
FIG. 2 illustrates a hardware configuration of an information processing apparatus.

FIG. 2 illustrates a hardware configuration of the information processing apparatus 100 illustrated in FIG. 1. In FIG. 2, the information processing apparatus 100 includes an input device 205 for receiving a user operation input, e.g., a keyboard or a pointing device. The information processing apparatus 100 further includes a display unit 202 for giving visual output information feedback to the user. The information processing apparatus 100 further includes a storage device random access memory (RAM) 203 storing various types of programs and execution information in the present exemplary embodiment, an external memory 206 such as a hard disk drive (HDD) or a flexible disk drive (FDD), and a read-only memory (ROM) 204. Further, the information processing apparatus 100 includes an interface device input/output (I/O) unit 207 for communicating with an external device, and includes a central processing unit (CPU) 201 for executing a program. A networking to a peripheral device may be wired or wireless. The information processing apparatus 100 is connected to the image processing apparatuses 101 and 102 via such an external device connection interface (I/F).

Figure 3:
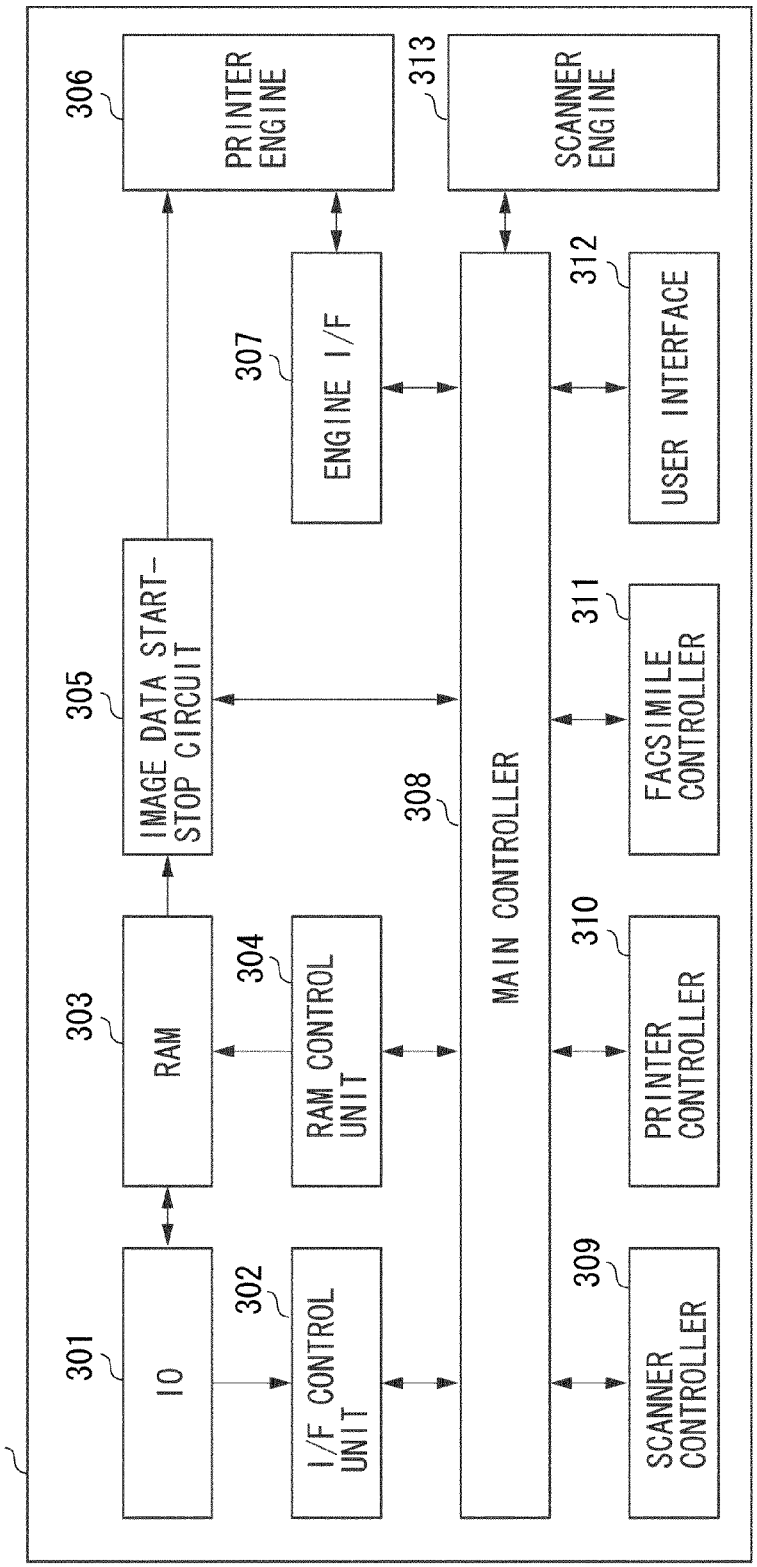
FIG. 3 illustrates a hardware configuration of an image processing apparatus.

FIG. 3 is a block diagram illustrating a hardware configuration of each of the image processing apparatuses 101 and 102 illustrated in FIG. 1. This example illustrates an MFP having a scanner function, a printer function, and a facsimile function.

In FIG. 3, an I/O unit 301 is connected to the information processing apparatus 100 via a communication medium such as a network (a LAN) 103. The I/O unit 301 may include a plurality of I/O units 301 to deal with a plurality of networking formats. The image processing apparatus 101 (102) transfers a device identifier (ID) and a scan image to the information processing apparatus 100 via the I/O unit 301. The image processing apparatus 101 (102) performs processing upon receipt of various types of control commands from the information processing apparatus 100.

An I/F control unit 302 performs control to issue a device ID with respect to a processing system such as a scanner, a printer, or a facsimile that is loaded into the image processing apparatus 101 (102). A RAM 303 is a primary storage device, and is used to store external data such as a control command acquired by the I/O unit 301 and an image read by a scanner engine 313. Further, the RAM 303 is used to store an image before being rasterized by a printer controller 310 and transferred to a printer engine 306.

A RAM control unit 304 performs allocation management of the RAM 303. An image data start-stop circuit 305 is a device for outputting the image, which has been loaded into the RAM control unit 304, acquired by the printer controller 310 and the scanner engine 313 as the printer engine 306 rotates. The printer engine 306 is a device for developing the image on output media such as paper.

A main controller 308 performs various types of control of the printer engine 306 by an engine I/F 307. The main controller 308 is a module serving as the core of control, and performs appropriate distribution processing of a control language that is received from the information processing apparatus 100 to a scanner controller 309, the printer controller 310, and a facsimile controller 311 via the I/O unit 301. Further, the main controller 308 controls the printer engine 306 and the scanner engine 313 with the support of the controllers 309, 310, and 311 and a user interface 312. Control interfaces between the main controller 308 and the controllers 309, 310, and 311 are unified so that an expansion board capable of processing a plurality of types of control commands can be loaded into one peripheral device. The function of the main controller 308 is to acquire a device ID of an expansion controller that is currently loaded from each of the controllers 309, 310, and 311 and manage the acquired device ID.

The scanner controller 309 decomposes a scan control command, which has been received from the information processing apparatus 100, into an internal execution instruction that can be interpreted by the main controller 308. An image, which has been read by the scanner engine 313, is changed into a scan control command. The printer controller 310 decomposes a page description language, which has been received from the information processing apparatus 100, into an internal execution instruction including a rasterized image of a page description language that can be interpreted by the main controller 308. The rasterized image is carried to the printer engine 306, and is printed on output media such as paper. The facsimile controller 311 rasterizes a facsimile control language, which has been received from the information processing apparatus 100, into an image, and transfers the image to another facsimile device and an Internet protocol-facsimile (IP-FAX) via a public line (not illustrated) or the Internet.

The user interface 312 is used as an input/output unit of an instruction issued by the user when the image processing apparatus 101 (102) directly performs various types of setting of the main controller 308, the scanner function, the printer function, and the facsimile function.

The scanner engine 313 reads the image, which has been printed using an optical apparatus by an instruction from the main controller 308, converts the read image into an electric signal, and transfers the electric signal to the main controller 308.

Figure 4:
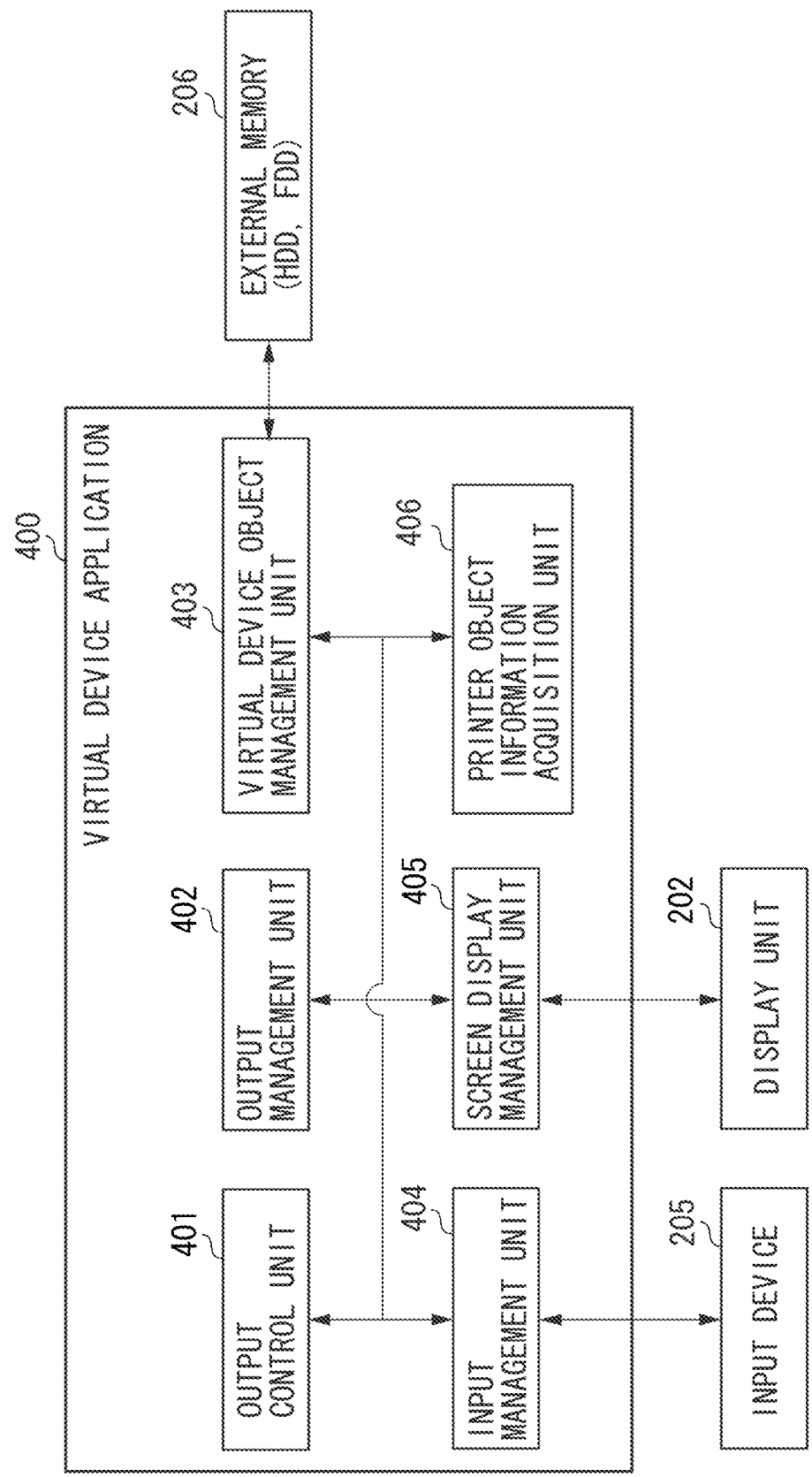
FIG. 4 illustrates a software configuration of a virtual device application.
Figure 7:
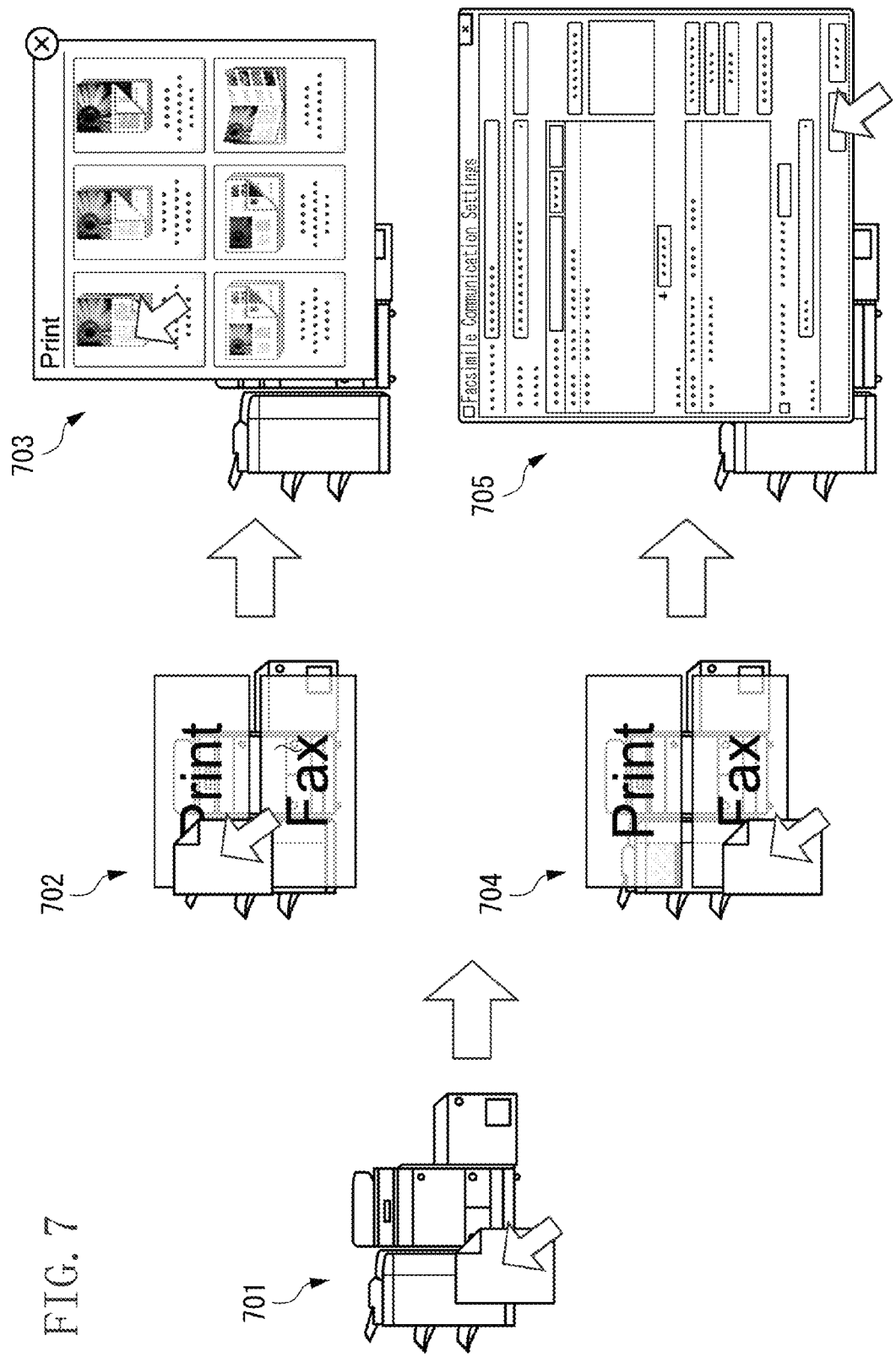
FIG. 7 illustrates an example of UI display during an output operation to a virtual device object.

FIG. 4 illustrates an example of a functional configuration of the virtual device application 400, which is executed by the information processing apparatus 100. The virtual device application 400 includes an input management unit 404, a screen display management unit 405, a printer object information acquisition unit 406, a virtual device object management unit 403, an output control device 401, and an output management unit 402. The input management unit 404 detects an operation of an input device 205 by the user via a graphical user interface (GUI) of the virtual device application 400, which has been displayed by the screen display management unit 405, and acquires operation information about the user. The screen display management unit 405 controls screen display such as display of a virtual device object and display of output selection, as illustrated in FIG. 7 as an example, as the GUI of the virtual device application 400.

In the present specification, the virtual device object is an object, which is operable by the user, displayed on the display unit 202 in the information processing apparatus 100.

The virtual device object may be displayed by a module of an OS that operates independently of the virtual device application 400.

The printer object information acquisition unit 406 acquires information about a printer object that is managed by the OS and information about a printer driver allocated to the printer object. The printer object information acquisition unit 406 determines whether the printer driver allocated to the printer object and the virtual device application 400 can cooperate with each other.

In the present specification, a printer object for printing and a printer object for facsimile transmission are represented as the same printer object. The printer object for printing and the printer object for facsimile transmission are properly used when they need to be clearly distinguished, and are both represented as a printer object when either one of them is not clearly specified.

Further, in the present specification, a printer driver for printing and a printer driver for facsimile transmission are represented as the same printer driver. The printer driver for printing and the printer driver for facsimile transmission are properly used when they need to be clearly distinguished, and are both represented as a printer driver when they need not be clearly specified or when either one of them is not clearly specified.

More specifically, an interface for controlling the function of the printer driver from the virtual device application 400 may be opened. The interface is opened as a software development kit (SDK) of the printer driver, and an operation for cooperation of the printer driver with the virtual device application 400 is ensured. The virtual device application 400 can perform control between the virtual device application 400 and the printer driver via the interface. The printer object information acquisition unit 406 determines whether the printer driver includes the interface, to determine whether the printer driver can cooperate with the virtual device application 400.

Figure 6:
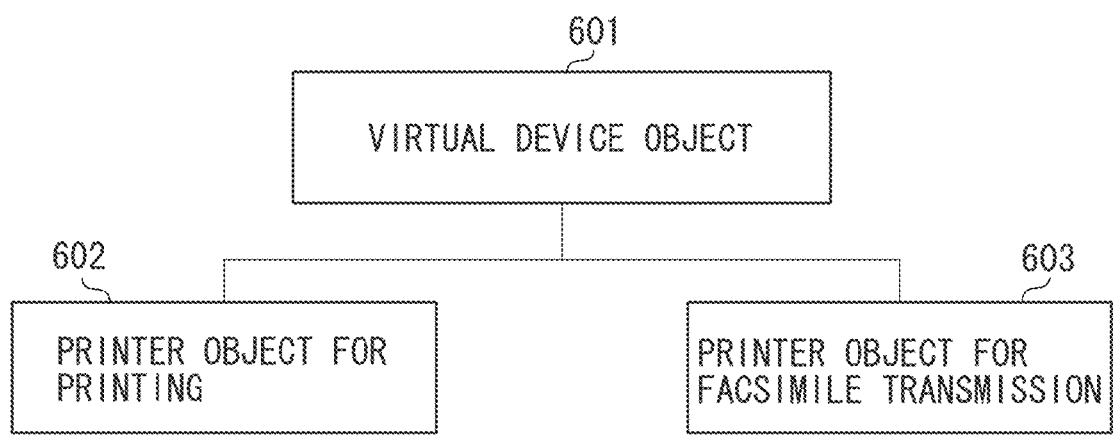
FIG. 6 illustrates a relationship between a virtual device object and printer objects.

The virtual device object management unit 403 generates and manages information about a configuration of the virtual device object, as illustrated in FIG. 6. More specifically, the configuration of the virtual device object is constructed based on information about the printer object that has been acquired by the printer object information acquisition unit 406. Further, the virtual device object management unit 403 performs control to write the information about the configuration of the virtual device object and information about setting such as function setting of the virtual device object into a setting file stored in the external memory 206 and read the setting information from the setting file.

The output control unit 401 issues, when receiving an output instruction from the user via the input management unit 404, an output instruction to the printer driver allocated to the corresponding printer object based on the output instruction. The output control unit 401 issues the output instruction to the printer driver for printing when it receives a printing instruction, and issues the output instruction to the printer driver for facsimile transmission when it receives a facsimile transmission instruction.

The printer driver, which has received the instruction, converts a file designated as the output instruction into output instruction information that can be interpreted by the image processing apparatus 101 (102). The output instruction information means information in a data format for printing (e.g., a page-description language (PDL)) obtained by the conversion in the case of the printing instruction, and means information in a data format for facsimile transmission (e.g., raster data) in the case of the facsimile transmission instruction. The printer driver sends the printing instruction information obtained by the conversion to the image processing apparatus 101 (102) via the network 103.

Figure 5:
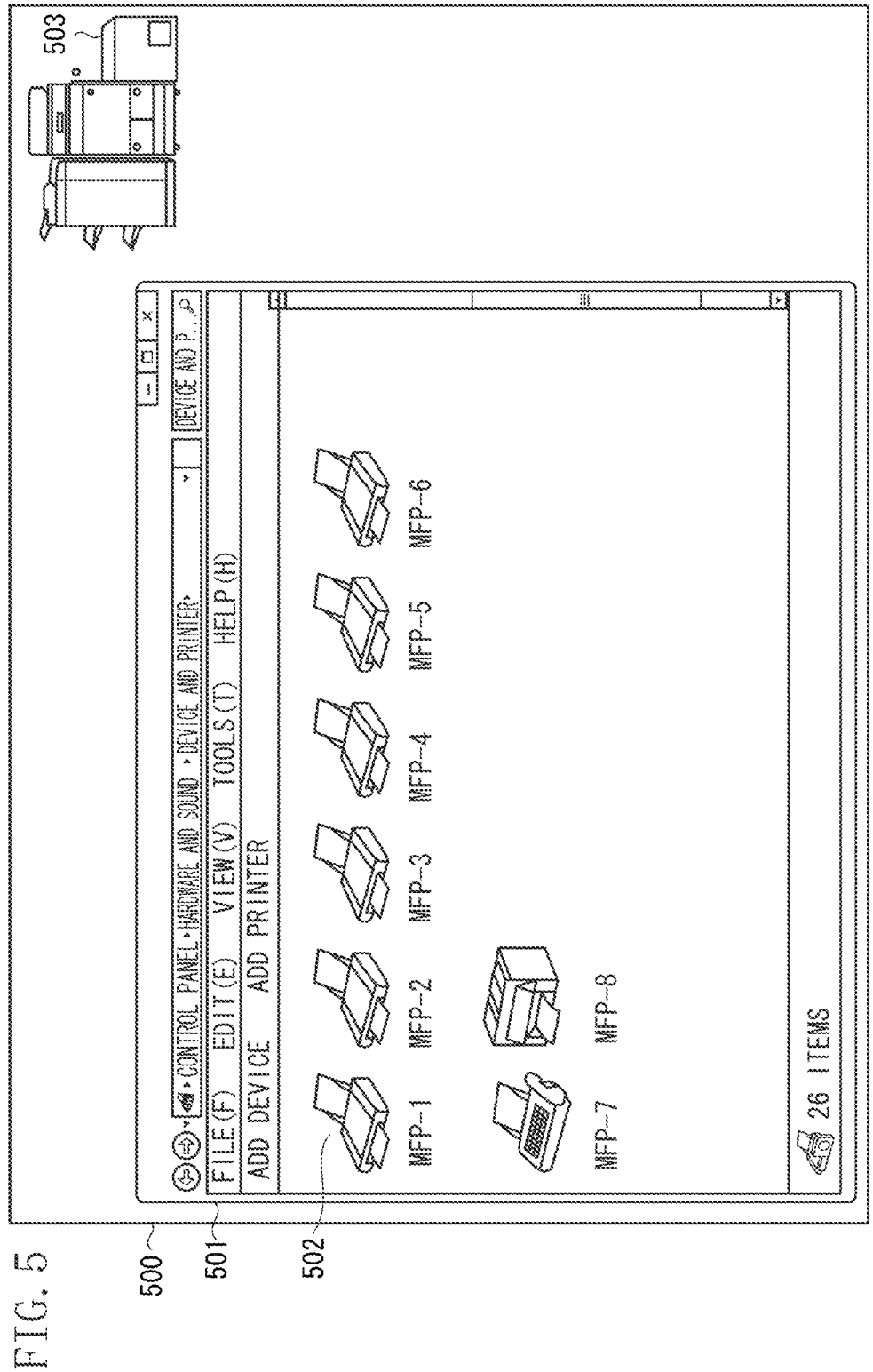
FIG. 5 illustrates an example of a management screen of printer objects in an operating system (OS) and user interface (UI) display of a virtual device application.

FIG. 5 schematically illustrates a management screen of printer objects in an OS and a display screen of the virtual device application 400. A desktop screen 500 is displayed by the OS. On a printer object management screen 501, a list of all printer objects 502, which are installed on the OS, is displayed.

When a printer driver is installed on the OS, the printer objects 502 allocated to the printer driver by the OS are displayed on the printer object management screen 501.

The printer objects 502 include a printer object for printing allocated to a printer driver for printing and a printer object for facsimile transmission allocated to a printer driver for facsimile transmission.

A virtual device object 503 is displayed in the virtual device application 400. The virtual device object 503 is displayed on the desktop of the OS, to receive an output instruction from the user. Thus, the user can easily implement desired output.

FIG. 6 schematically illustrates a relationship between a virtual device object and printer objects. A virtual device object 601 is allocated a printer object for printing 602 and a printer object for facsimile transmission 603, which respectively correspond to the specified image processing apparatuses. The virtual device object 601 performs output via the printer object for printing 602 when it receives a printing instruction from the user. The virtual device object 601 performs output via the printer object for facsimile transmission 603 when it receives a facsimile transmission instruction from the user.

If a plurality of image processing apparatuses exists, like in the system configuration in the present exemplary embodiment, one virtual device object 503 can be generated in each of the image processing apparatuses 101 and 102. One virtual device object 503 can also be allocated the printer object for printing 602 corresponding to the image processing apparatus 101 and the printer object for facsimile transmission 603 corresponding to the image processing apparatus 102.

FIG. 7 schematically illustrates a display UI during an output operation of the virtual device application 400. When the virtual device application 400 receives a drag of a file over a virtual device object 701 by the user, output selection display portions 702 and 704 are displayed on the virtual device object 701.

In the present specification, the output selection display portion means a display area on a virtual device object for receiving a drop of the file by the user. The display area is divided into a printing portion for receiving a printing instruction and a facsimile transmission portion for receiving a facsimile transmission instruction.

Then, desired output can be implemented upon receipt of an execution instruction by dragging and dropping the file over a portion where output is to be performed. The virtual device application 400 displays a UI screen 703 for designating print setting when it receives a drop operation over a printing portion in the output selection display portion 702. The user selects the print setting, to execute a printing instruction to the image processing apparatus. The virtual device application 400 displays a destination specifying screen 705 for facsimile transmission when it receives a drop operation over a facsimile transmission portion in the output selection display portion 704. The user specifies a destination and performs an execution operation, to execute a facsimile transmission instruction to the image processing apparatus. As UIs displayed on the UI screen 703 and the destination specifying screen 705, a UI managed by the virtual device application 400 may be displayed. Alternatively, a UI of a printer object corresponding to the virtual device object 701 may be called.

Figure 8:
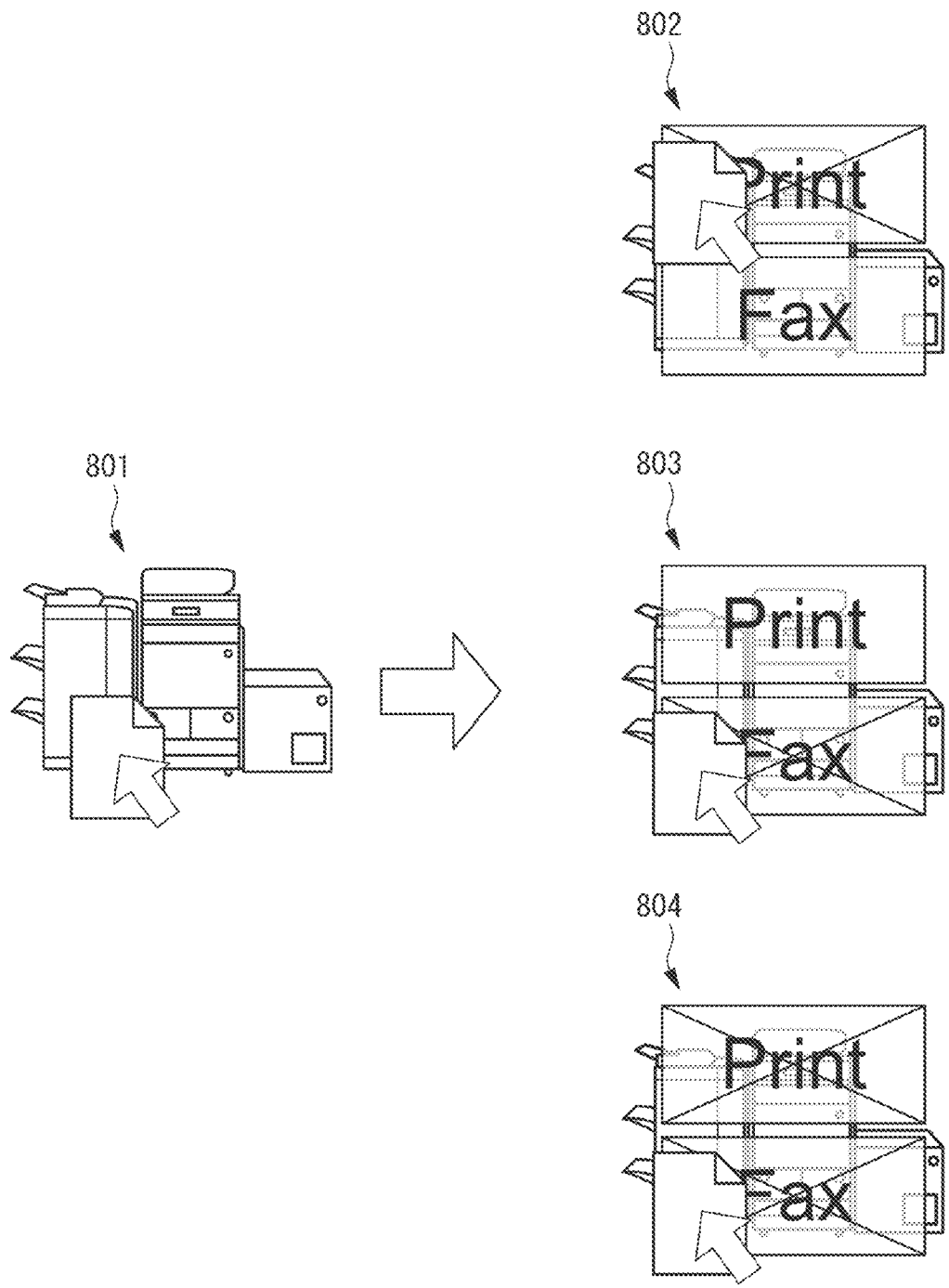
FIG. 8 illustrates an example of UI display during an output operation of a virtual device application when output cannot be performed.

FIG. 8 schematically illustrates a display UI during an output operation of the virtual device application 400 when a printer object allocated to the virtual device application 400 does not exist (e.g., the user has deleted the printer object). The virtual device application 400 displays output selection display portions 802, 803, and 804 on a virtual device object 801 when it receives a drag of a file over the virtual device object 801 by the user. The output selection display portion 802 is displayed when the printer object for printing 602 does not exist and indicates that printing cannot be performed. The output selection display portion 803 is displayed when the printer object for facsimile transmission 603 does not exist and indicates that facsimile transmission cannot be performed. The output selection display portion 804 is displayed when neither the printer object for printing 602 nor the printer object for facsimile transmission 603 exists and indicates that neither printing nor facsimile transmission can be performed.

As described in flowcharts of FIGS. 10A, 10B, and 10C, described below, if the output selection display portion indicates that output cannot be performed, the corresponding printer object does not exist so that printing or facsimile transmission is not performed even if the file is dropped.

A method for indicating that output cannot be performed is not limited to a method for displaying a mark "x" illustrated in FIG. 8, and may be a method for changing the color of the output selection display portion and a method for changing a mouse cursor, for example.

Figure 9:
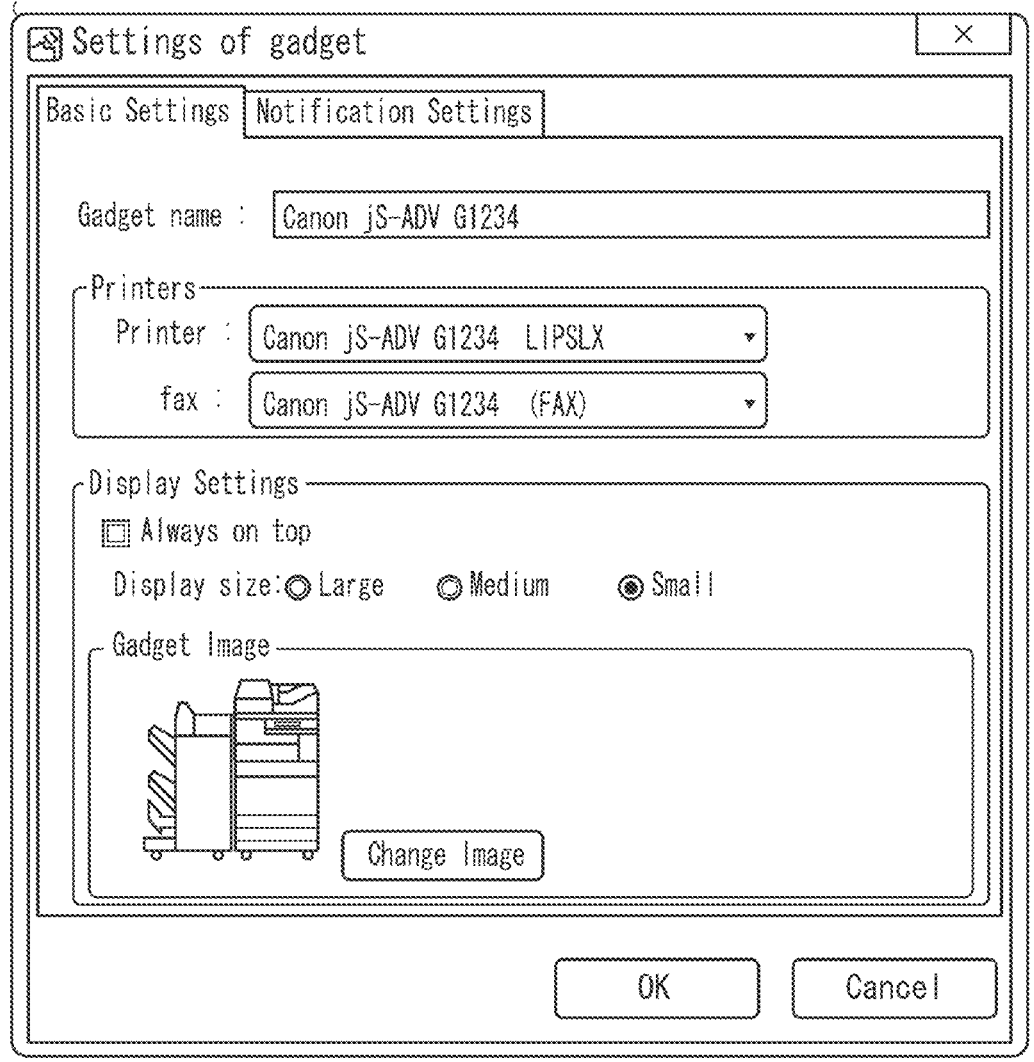
FIG. 9 illustrates an example of UI display for performing setting to allocate printer objects to a virtual device object.

FIG. 9 illustrates a UI for performing setting to allocate a printer object for printing 602 and a printer object for facsimile transmission 603 to a virtual device object. In a UI 901, each of the printer object for printing 602 and the printer object for facsimile transmission 603 can be selected from a comb box. A list of candidates for printer objects that can be allocated is displayed in the comb box. A UI for performing setting to allocate a printer object is not limited to that illustrated in FIG. 9. The UI may include a method for selecting a printer object from a check box.

Figure 10A:
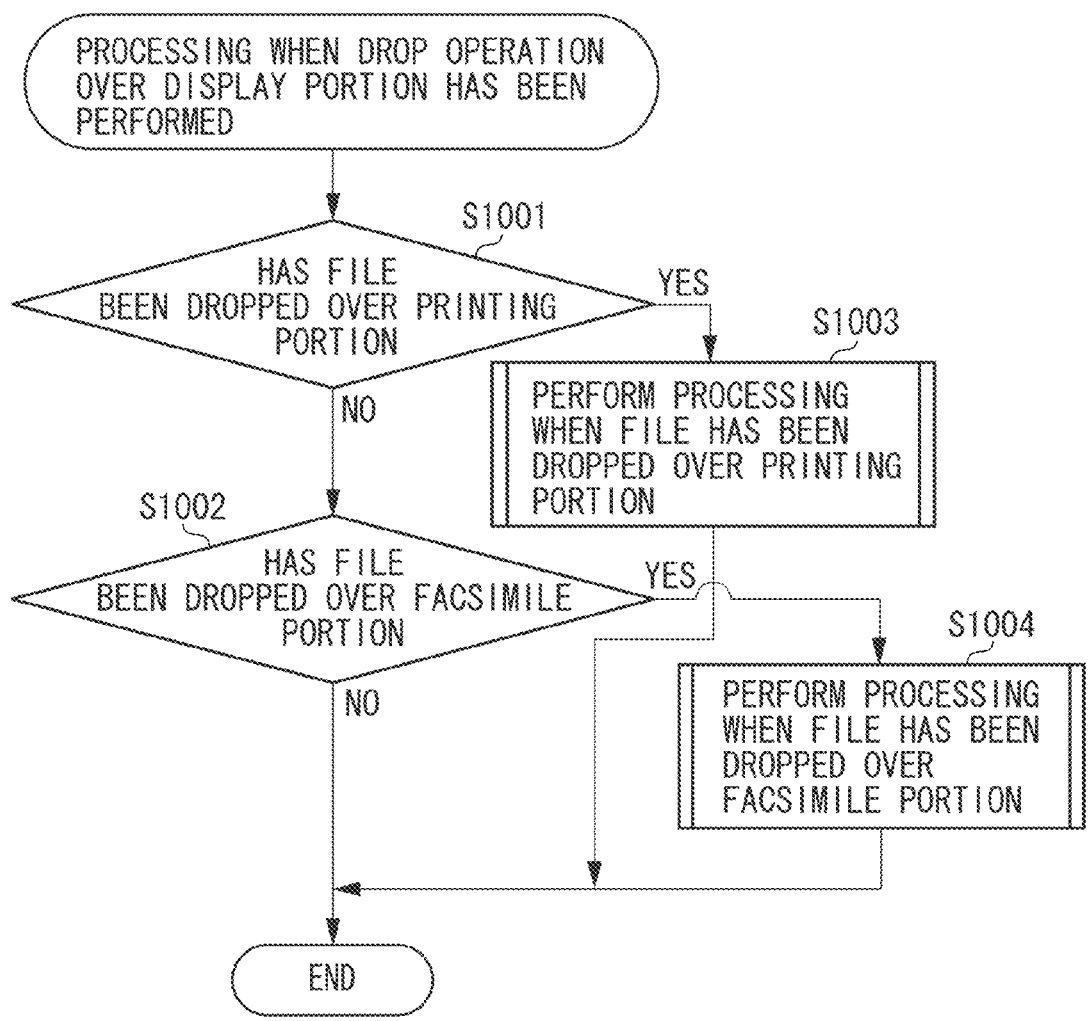

FIGS. 10A, 10B, and 10C illustrate flows of processing performed when the virtual device application 400 has received a drop operation over an output selection display portion displayed on the virtual device object 503.

Steps S1001 to S1029 are implemented when the CPU 201 loads the virtual device application 400 and the printer driver stored in the ROM 204 and the external memory 206 into the RAM 203 and executes the virtual device application 400 and the printer driver.

In step S1001, the screen display management unit 405 determines whether a drop operation of a file by the user has been performed over a printing portion. If it is determined that the drop operation has not been performed over the printing portion (NO in step S1001), then in step S1002, the screen display management unit 405 determines whether the drop operation of the file by the user has been performed over a facsimile transmission portion. If it is determined that the drop operation has not been performed over the facsimile transmission portion (NO in step S1002), the virtual device application 400 ends the processing.

If it is determined that the drop operation has been performed over the printing portion (YES in step S1001), then in step S1003, the virtual device application 400 performs processing when the file has been dropped over the printing portion. If it is determined that the drop operation has been performed over the facsimile transmission portion (YES in step S1002), then in step S1004, the virtual device application 400 performs processing when the file has been dropped over the facsimile transmission portion.

Steps S1011 to S1019 represent processing performed by the virtual device application 400 when the file has been dropped over the printing portion. The virtual device object management unit 403 first acquires the printer object for printing 602 associated with the virtual device object 601. In step S1011, the virtual device object management unit 403 further confirms whether the acquired printer object for printing 602 exists in a list of printer objects that have been acquired from the printer object information acquisition unit 406. If the printer object for printing 602 exists (YES in step S1011), then in step S1012, the output control unit 401 issues an instruction to output the dropped file to the printer driver allocated to the printer object for printing 602. Thus, the image processing apparatus performs printing based on the file. More specifically, the printer driver converts the file into output instruction information and transmits the output instruction information obtained by the conversion to the image processing apparatus, as described above.

If the printer object for printing 602 does not exist (NO in step S1011), the virtual device object management unit 403 acquires the printer object for facsimile transmission 603 allocated to the virtual device object 601.

A case where a printer object does not exist can include a case where the user has deleted a printer object allocated to a virtual device object.

In step S1013, the virtual device object management unit 403 further confirms whether the acquired printer object for facsimile transmission 603 exists in the list of printer objects that have been acquired from the printer object information acquisition unit 406. If the printer object for facsimile transmission 603 exists (YES in step S1013), then in step S1014, the screen display management unit 405 outputs a confirmation screen inquiring of the user "A printer object for printing has been deleted. Do you reset the printer object for printing?" to the screen. In step S1015, the screen display management unit 405 determines whether the user has selected the resetting of the printer object for printing 602 for the confirmation screen. If the user has not selected the resetting of the printer object for printing 602 for the confirmation screen (NO in step S1015), the virtual device application 400 ends the processing. If the user has selected the resetting of the printer object for printing 602 for the confirmation screen (YES in step S1015), then in step S1016, the screen display management unit 405 displays a setting screen for accepting a change in the printer object from the user. The setting screen displayed in step S1016 is the UI 901 illustrated in FIG. 9. If the printer object for facsimile transmission 603 does not exist (NO in step S1013), then in step S1017, the screen display management unit 405 outputs a confirmation screen stating "Do you set or delete a gadget?" to the screen.

In the present specification, a gadget (widget) and a virtual device object are synonymous.

In step S1018, the screen display management unit 405 determines whether the user sets the gadget, deletes the gadget, or neither sets nor deletes the gadget for the confirmation screen. If the user selects the setting of the gadget for the confirmation screen, then in step S1016, the screen display management unit 405 displays the setting screen. If the user selects the deletion of the gadget for the confirmation screen, then in step S1019, the virtual device object management unit 403 deletes the virtual device object 601. If the user selects neither the setting nor the deletion of the gadget for the confirmation screen, the virtual device application 400 ends the processing.

Steps S1021 to S1029 represent processing performed by the virtual device application 400 when the file has been dropped over the facsimile transmission portion.

The virtual device object management unit 403 first acquires the printer object for facsimile transmission 603 associated with the virtual device object 601. In step S1021, the virtual device object management unit 403 further confirms whether the acquired printer object for facsimile transmission 603 exists in the list of printer objects that have been acquired from the printer object information acquisition unit 406. If the printer object for facsimile transmission 603 exists (YES in step S1021), then in step S1022, the output control unit 401 issues an instruction to output the dropped file to the printer driver allocated to the printer object for facsimile transmission 603. Thus, the image processing apparatus performs facsimile transmission based on the file. More specifically, the printer driver converts the file into output instruction information and transmits the output instruction information obtained by the conversion to the image processing apparatus, as described above.

If the printer object for facsimile transmission 603 does not exist (NO in step S1021), the virtual device object management unit 403 acquires the printer object for printing 602 associated with the virtual device object 601. In step S1023, the virtual device object management unit 403 further confirms whether the acquired printer object for printing 602 exists in the list of printer objects that have been acquired from the printer object information acquisition unit 406. If the printer object for printing 602 exists (YES in step S1023), then in step S1024, the screen display management unit 405 outputs a confirmation screen inquiring of the user "A printer object for facsimile transmission has been deleted. Do you reset a printer object for facsimile transmission?" to the screen. In step S1025, the screen display management unit 405 determines whether the user has selected the resetting of the printer object for facsimile transmission 603 for the confirmation screen. If the user has not selected the resetting of the printer object for facsimile transmission 603 for the confirmation screen (NO in step S1024), the virtual device application 400 ends the processing. If the user has selected the resetting of the printer object for facsimile transmission 603 for the confirmation screen (YES in step S1024), then in step S1026, the screen display management unit 405 displays a setting screen. The setting screen displayed in step S1026 is the UI 901 illustrated in FIG. 9.

If the printer object for printing 602 does not exist (NO in step S1023), then in step S1027, the screen display management unit 405 outputs a confirmation screen stating "Do you set or delete a gadget?" to the screen. In step S1028, the screen display management unit 405 determines whether the user sets the gadget, deletes the gadget, or neither sets nor deletes the gadget for the confirmation screen. If the user has selected the setting of the gadget for the confirmation screen, then in step S1026, the screen display management unit 405 displays a setting screen. If the user has selected the deletion of the gadget for the confirmation screen, then in step S1029, the virtual device object management unit 403 deletes the virtual device object 601. If the user has selected neither the setting nor the deletion of the gadget for the confirmation screen, the virtual device application 400 ends the processing.

As a result of the processing flows, even if the printer object for implementing a desired operation does not exist when the user has performed the drop operation over the virtual device object 601, the user can receive an appropriate confirmation screen, resulting in improved convenience.

Figure 11A:
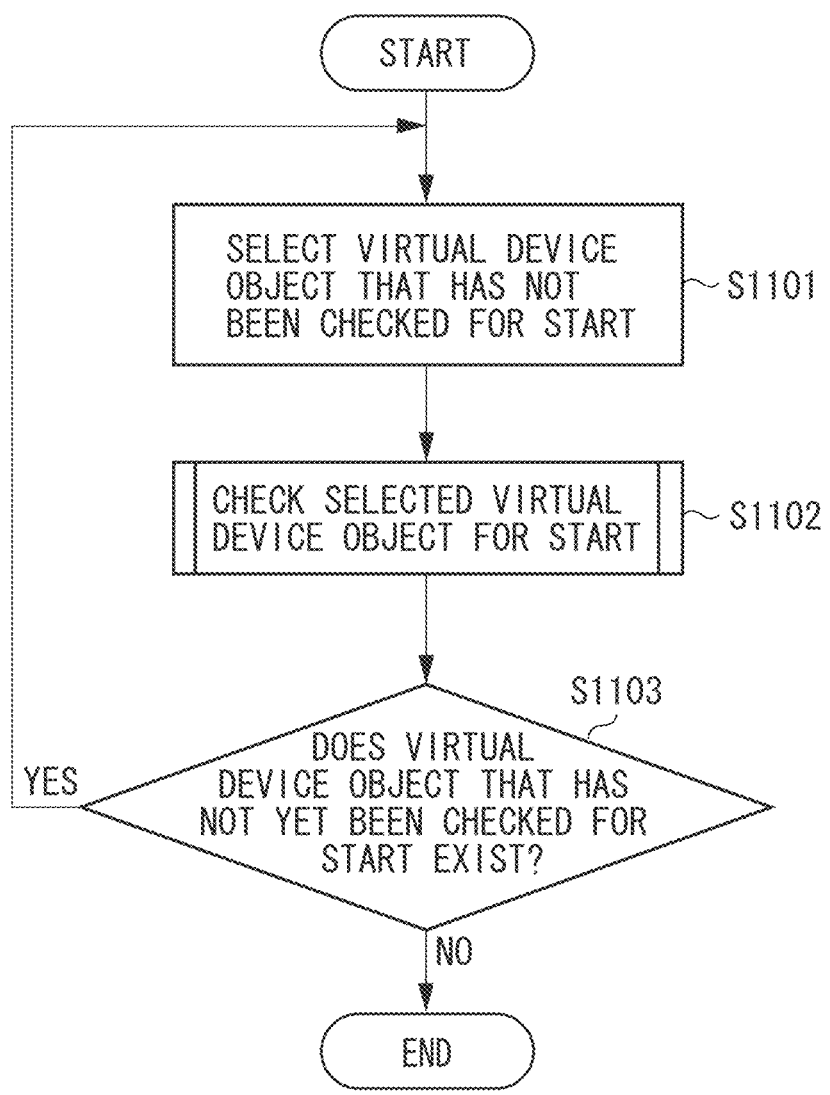
FIGS. 11A and 11B are flowcharts of processing performed when it is confirmed whether a printer object allocated to a virtual device object exists at the start time.
Figure 11B:
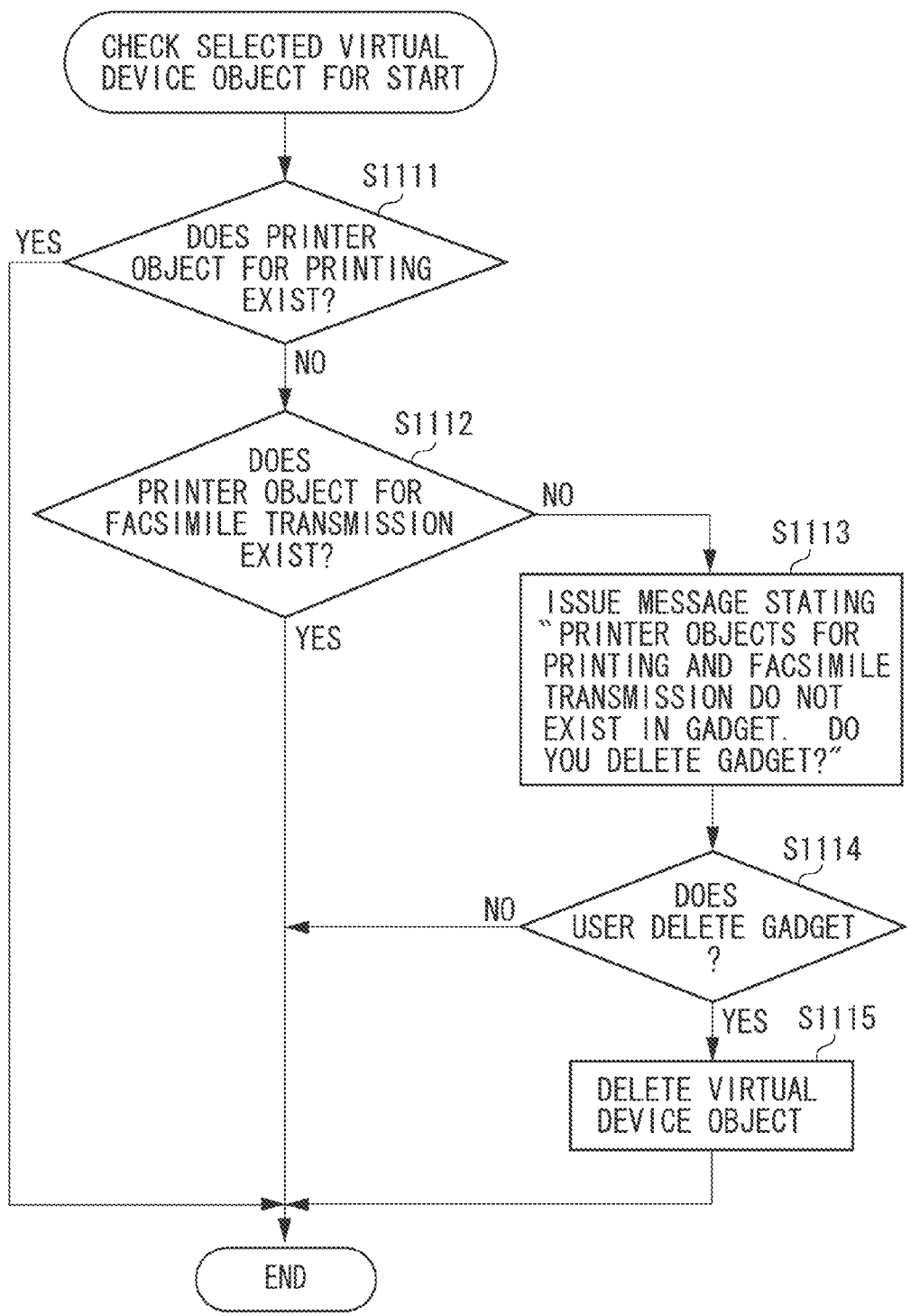

FIGS. 11A and 11B illustrate flows of processing performed when it is confirmed with all the virtual device objects whether the printer object allocated to each of the virtual device objects exists when the virtual device application 400 is started. This processing is referred to as a start check.

Steps S1101 to S1115 are implemented when the CPU 201 loads the virtual device application 400 and the printer driver stored in the ROM 204 and the external memory 206 into the RAM 203 and executes the virtual device application 400 and the printer driver.

In step S1101, the virtual device object management unit 403 selects the virtual device objects 601 that has not yet been checked for start. The order of virtual device objects 601 to be selected is optional. For example, the virtual device objects 601 may be selected in the order in which they are registered in the virtual device application 400. In step S1102, the virtual device application 400 checks the selected virtual device object 601 for start. The processing flows for confirmation will be described below. In step S1103, the virtual device application 400 confirms whether the virtual device object 601, which has not yet been checked for start, exists. If the virtual device object 601, which has not yet been checked for start, does not exist (NO in step S1103), the virtual device application 400 ends the processing. If the virtual device object 601, which has not yet been checked for start, exists (YES in step S1103), the processing in steps S1101 to S1103 is repeated.

Steps S1111 to S1115 represent processing for the virtual device application 400 to check the virtual device object 601 for start.

In step S1111, the virtual device object management unit 403 acquires information indicating whether the printer object for printing 602 allocated to the virtual device object 601 exists from the printer object information acquisition unit 406. If the printer object for printing 602 exists (YES in step S1111), the virtual device application 400 ends the processing. If the printer object for printing 602 does not exist (NO in step S1111), then in step S1112, the virtual device object management unit 403 confirms whether the printer object for facsimile transmission 603 allocated to the virtual device object 601 exists from the printer object information acquisition unit 406. If the printer object for facsimile transmission 603 exists (YES in step S1112), the virtual device application 400 ends the processing. If the printer object for facsimile transmission 603 does not exist (NO in step S1112), then in step S1113, the screen display management unit 405 outputs a confirmation screen stating "Printer objects for printing and facsimile transmission do not exist in a gadget. Do you delete the gadget?" to the display unit 202. In step S1114, the vertical device object management unit 403 determines whether the user has selected "delete" for the confirmation screen. If the user has selected "delete" (YES in step S1114), then in step S1115, the virtual device object management unit 403 deletes the virtual device object 601. If the user has not yet selected "delete" (NO in step S1114), the virtual device application 400 ends the processing in the flow.

As a result of the processing flows illustrated in FIGS. 11A and 11B, if the printer object allocated to the virtual device object does not exist at the start of the virtual device application 400, the user can be prompted to delete the virtual device object 601. When the printer object allocated to the virtual device object 601 does not exist, therefore, the number of times of an output operation erroneously performed by the user to the virtual device object 601 can be reduced.

FIG. 12 illustrates a flow of processing performed when the virtual device application 400 has received, when the printer object allocated to the virtual device object 503 does not exist, a drag of the file over the virtual device object 503 from the user.

The processing flow is implemented when the virtual device object management unit 403 stores information indicating that the printer object allocated to the virtual device object 601 does not exist.

A method for storing the information includes a method for the virtual device object management unit 403 to store a flag indicating whether the printer object for printing 602 and the printer object for facsimile transmission 603 exist. In this case, the virtual device object management unit 403 sets, if it is determined that the printer object does not exist in the processing flows illustrated in FIGS. 10A, 10B, and 10C and FIGS. 11A and 11B, a flag of the determined printer object to "non-existent".

The flag is stored to perform processing because it may take time to acquire the printer object from the printer object information acquisition unit 406. In such a case, when the existence of the printer object is confirmed during a drag of the file, it takes time to display the output selection display portion, resulting in hampered user's convenience. Accordingly, processing for acquiring the printer object from the OS by storing the flag to perform processing may not be performed, and the speed of processing for indicating whether output can be performed can be increased, resulting in improved user's convenience.

The virtual device object management unit 403 need not store information indicating that the printer object allocated to the virtual device object 601 does not exist. In the case, processing for acquiring the printer object from the printer object information acquisition unit 406 is performed.

In FIG. 12, steps S1201 to S1204 are implemented when the CPU 201 loads the virtual device application 400 and the printer driver stored in the ROM 204 and the external memory 206 into the RAM 203 and executes the virtual device application 400 and the printer driver.

In step S1201, the virtual device object management unit 403 first confirms whether the printer object for printing 602 allocated to the virtual device object 601 exists. If the printer object for printing 602 does not exist (NO in step S1201), then in step S1203, the screen display management unit 405 brings the printing portion in the output selection display portion into an unusable state.

The unusable state includes a state where a printing selection display portion cannot be selected by the user or a state where the printing selection display portion is not displayed. The present invention is not limited to these implementing methods.

In step S1202, the virtual device object management unit 403 confirms whether the printer object for facsimile transmission 603 allocated to the virtual device object 601 exists. If the printer object for facsimile transmission 603 does not exist (NO in step S1202), then in step S1204, the screen display management unit 405 brings the facsimile transmission portion in the output selection display portion into an unusable state.

The processing flow illustrated in FIG. 12 may be implemented for all virtual device objects when the virtual device application 400 is started, like that illustrated in FIGS. 11A and 11B.

The processing flow can result in preventing, when the printer object allocated to the virtual device object does not exist, the user from erroneously performing an output operation to the virtual device object.

In the first exemplary embodiment, the existence of the printer object is confirmed when the virtual device application 400 is started or when the drop operation over the output selection display portion displayed on the virtual device object 503 has been received.

In a second exemplary embodiment, to further improve user's convenience, a virtual device application 400 monitors an output port set to a printer object and detects whether the printer object has been deleted.

A difference between the second exemplary embodiment and the first exemplary embodiment in processing of the virtual device application 400 will be described below with reference to a flowchart illustrated in FIG. 13. Each of processing flows in the second exemplary embodiment is implemented when the CPU 201 loads the virtual device application 400 and a printer driver stored in the ROM 204 and the external memory 206 into the RAM 203 and executes the virtual device application 400 and the printer driver. If not otherwise specified, the virtual device application 400 in the second exemplary embodiment is similar to that in the configuration in the first exemplary embodiment.

In the second exemplary embodiment, it can be detected that the printer object has been deleted when the output port set in the printer object is an application-compatible port of the virtual device application 400. The application-compatible port of the virtual device application 400 means a port, capable of monitoring a state of the printer object, of the virtual device application 400. A case where a printer set in the printer object is a shared printer, for example, does not correspond to the second exemplary embodiment because an output port of the printer object in the shared printer is not an application-compatible port.

The output management unit 402 detects that the printer driver allocated to the printer object has been deleted via the application-compatible port of the virtual device application 400. In step S1301, the virtual device object management unit 403 sets a flag of the determined printer object to "nonexistent" after the detection.

The screen display management unit 405 may output a confirmation screen stating "Do you set a gadget?" or "Do you set or delete a gadget?" to a screen and set and delete a gadget. The specific procedure for implementation is as described in steps S1013 to S1019 and steps S1023 to S1029.

In the start check in the first exemplary embodiment, even if one of the printer object for printing 602 and the printer object for facsimile transmission 603 allocated to the virtual device object is deleted, a user is not prompted to set the virtual device object. In the second exemplary embodiment, the user can be prompted to set the virtual device object at the time point where the user has also deleted the printer object that has not yet been thus checked.

Further, in the first exemplary embodiment, it is not checked, when the printer object for printing 602 allocated to the virtual device object exists, whether the printer object for facsimile transmission 603 exists after a file is dropped over the printing portion on the virtual device object, nor vice versa: it is not checked, when the printer object for facsimile transmission 603 exists, whether the printer object for printing 602 exists after the file is dropped over the facsimile transmission portion on the virtual device object. In the second exemplary embodiment, it is detected that the printer object, which has not yet been thus checked, has been deleted at the time point where it has been deleted by the user. It is indicated that output cannot be performed based on the detection, or the user can be prompted to set and delete the virtual device object. Thus, the user can be prevented from erroneously performing, when the printer object allocated to the virtual device object does not exist, an output operation for the virtual device objet.

In the first exemplary embodiment, when the virtual device application 400 receives the drop operation over the output selection display portion displayed on the virtual device object 503, the existence of the printer object is confirmed.

In a third exemplary embodiment, another processing method performed when a virtual device application 400 has received a drop operation over a virtual device object will be described. Even when a corresponding printer object exists, the existence of another printer object allocated to a virtual device object 601 is confirmed.

Figure 14A:
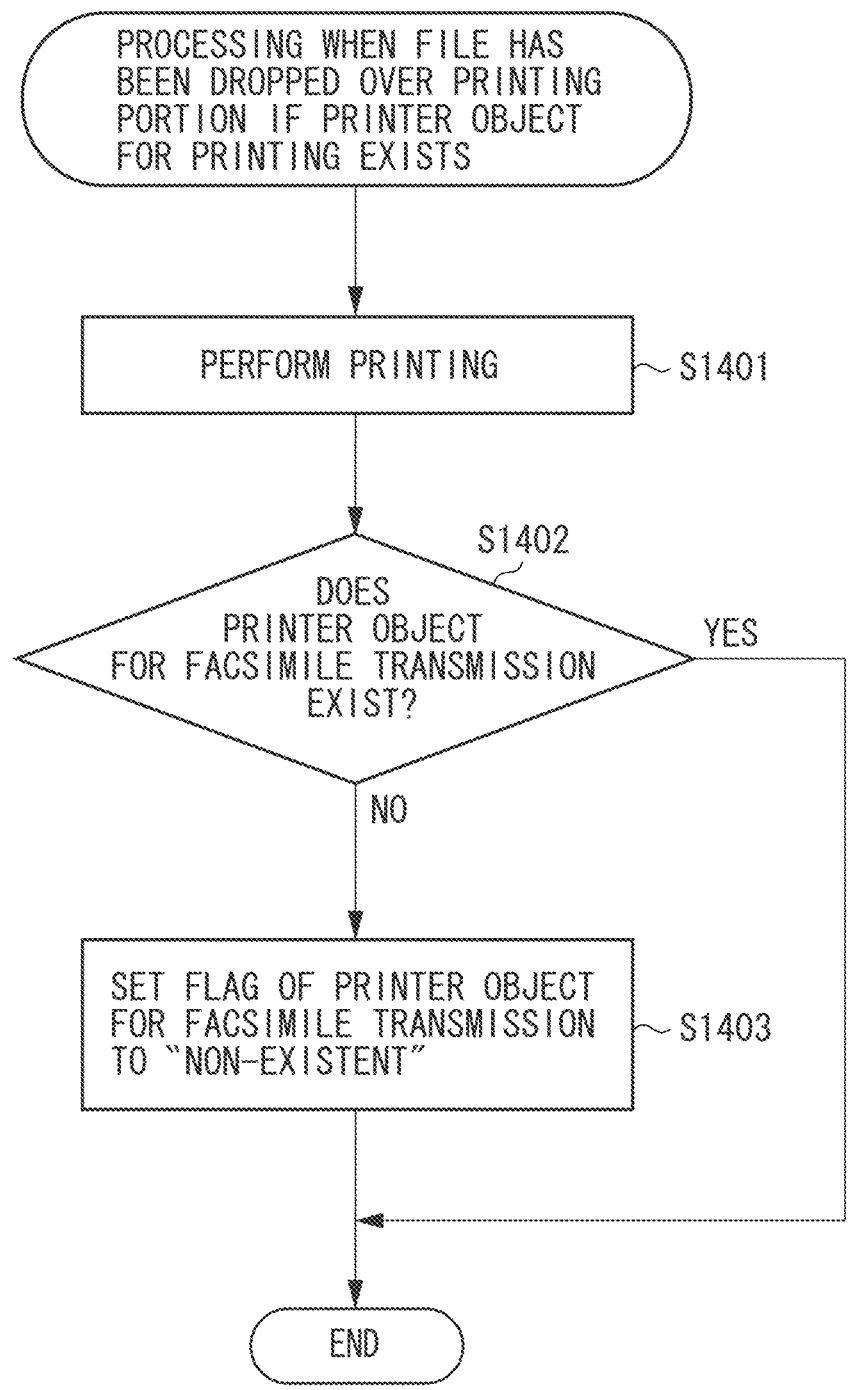
FIGS. 14A and 14B are flowcharts of processing performed when there exists, when a virtual device object has received a drop operation, a corresponding printer object.
Figure 14B:
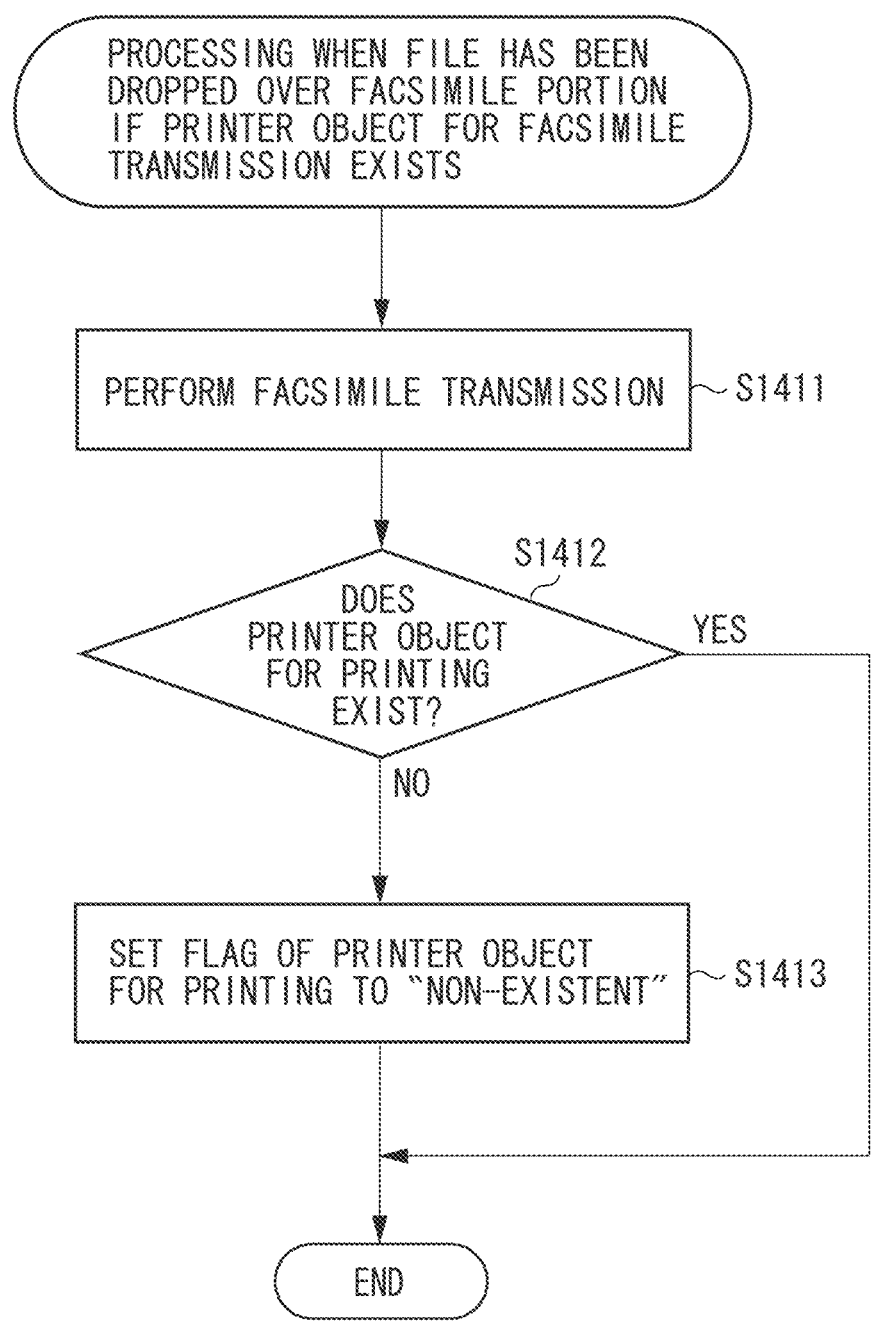

A difference between the third exemplary embodiment and the first exemplary embodiment in processing of the virtual device application 400 will be described below with reference to flowcharts illustrated in FIGS. 14A and 14B. Each of processing flows in the third exemplary embodiment is implemented when the CPU 201 loads the virtual device application 400 and a printer driver stored in the ROM 204 and the external memory 206 into the RAM 203 and executes the virtual device application 400 and the printer driver. If not otherwise specified, the virtual device application 400 in the present exemplary embodiment is similar to that in the configuration of the first exemplary embodiment.

Steps S1401 to S1403 premise a state where a printer object for printing allocated to the virtual device object 503 exists, and represents processing performed by the virtual device application 400 when a file has been dropped over a printing portion of the virtual device object 503 under this premise. This processing flow can be implemented by replacing the processing in step S1012 illustrated in FIG. 10 in the first exemplary embodiment.

In step S1401, the output control unit 401 issues an output instruction to a printer driver allocated to the printer object for printing 602. The virtual device object management unit 403 then acquires the printer object for facsimile transmission 603 allocated to the virtual device object 601. In step S1402, the virtual device object management unit 403 further confirms whether the acquired printer object for facsimile transmission 603 exists in a list of printer objects that have been acquired from the printer object information acquisition unit 406. If the printer object for facsimile transmission 603 exists (YES in step S1402), the virtual device application 400 ends the processing. If the printer object for facsimile transmission 603 does not exist (NO in step S1402), then in step S1403, the virtual device object management unit 403 sets a flag of the printer object for facsimile transmission 603 to "non-existent".

Steps S1411 to S1413 represent processing performed by the virtual device application 400 when the file has been dropped over a facsimile transmission portion on the virtual device object 503 while the printer object for facsimile transmission 603 exists. This processing flow can be implemented by replacing step S1022 illustrated in FIG. 10C in the first exemplary embodiment.

In step S1411, the output control unit 401 first issues an output instruction to a printer driver allocated to the printer object for facsimile transmission 603. The virtual device object management unit 403 acquires the printer object for printing 602 allocated to the virtual device object 601. In step S1412, the virtual device object management unit 403 confirms whether the acquired printer object for printing 602 exists in the list of printer objects that have been acquired from the printer object information acquisition unit 406. If the printer object for printing 602 exists (YES in step S1412), the virtual device application 400 ends the processing. If the printer object for printing 602 does not exist (NO in step S1412), then in step S1413, the virtual device object management unit 403 sets a flag of the printer object for printing 602 to "non-existent".

As a result of the processing flows, a user can recognize that an output instruction cannot be executed by the virtual device object 601 before being executed (the processing flow illustrated in FIG. 12), resulting in improved convenience.

In the second exemplary embodiment, a method for detecting whether the printer object is deleted when the output port set in the printer object is an application-compatible port of the virtual device application 400 has been described. In the third exemplary embodiment, even if the output port of the printer object is not the application-compatible port, it is checked whether the printer object has been deleted when the file is dropped. Based on the check, it is indicated that output cannot be performed based on the check, or the user can be prompted to set or delete the virtual device object. Thus, the user can be prevented from erroneously performing an output operation to the virtual device object.

According to the exemplary embodiments of the present invention, a gadget having high operability for performing processing using a printer driver can be provided.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-038882 filed Feb. 24, 2012, which is hereby incorporated by reference herein in its entirety.

What is claimed is:

1. An information processing apparatus comprising:
   a processor; and
   a memory connected to the processor, the processor and the memory configured to provide an allocation unit, an instruction unit, and a deletion unit;
   the allocation unit configured to allocate a first printer object and a second printer object to a device object for receiving, in a first area, an instruction to execute a first function and for receiving, in a second area, an instruction to execute a second function;
   the instruction unit configured to issue, when the instruction to execute the first function is received from a user and the first printer object exists, an instruction to perform output using a driver allocated to the first printer object, and to issue, when the instruction to execute the second function is received from the user and the second printer object exists, an instruction to perform output using a driver allocated to the second printer object; and
   the deletion unit configured to delete the device object when the first printer object and the second printer object do not exist,
   wherein the first area and the second area are concurrently displayed.

2. The information processing apparatus according to claim 1, wherein the first function is a function of performing printing using an image processing apparatus, the second function is a function of performing facsimile transmission using the image processing apparatus, the first printer object is a printer object for printing, and the second printer object is a printer object for facsimile transmission.

3. The information processing apparatus according to claim 1, wherein the device object is an object for receiving a drop of a file from the user, and
   wherein the instruction unit issues, when the instruction to execute the first function is received from the user by the drop of the file and the first printer object exists, the instruction to perform output based on the file using the driver allocated to the first printer object, and issues, when the instruction to execute the second function is received from the user by the drop of the file and the second printer object exists, the instruction to perform output based on the file using the driver allocated to the second printer object.

4. The information processing apparatus according to claim 1, further comprising a display unit configured to display, when the first printer object and the second printer object do not exist when a virtual device application serving as an application for displaying the device object is started, a confirmation screen for confirming whether the device object is to be deleted,
wherein the deletion unit deletes the device object when the instruction to delete the device object is received from the user via the confirmation screen for confirming whether the device object is to be deleted.

5. The information processing apparatus according to claim 1, further comprising a display unit configured to display, when the instruction to execute the first function is received from the user and the first printer object does not exist or when the instruction to execute the second function is received from the user and the second printer object does not exist, a setting screen for receiving an instruction to change the printer object allocated to the device object from the user.

6. The information processing apparatus according to claim 1, wherein the deletion unit deletes, when the instruction to execute the first function or the instruction to execute the second function is received from the user and the first printer object and the second printer object do not exist, the device object.

7. The information processing apparatus according to claim 1, further comprising a processing unit configured to display a first output selection display portion serving as a display area for executing the first function and a second output selection display portion serving as a display area for executing the second function, to display the first output selection display portion as an unusable state when the first printer object does not exist, and to display the second output selection display portion as an unusable state when the second printer object does not exist.

8. The information processing apparatus according to claim 1, further comprising a processing unit configured to display, when the instruction to execute the first function is received from the user and the first printer object does not exist or when the instruction to execute the second function is received from the user and the second printer object does not exist, a confirmation screen for confirming whether a setting screen is to be displayed, and to display, when the instruction to display the setting screen is received from the user via the confirmation screen, the setting screen.

9. The information processing apparatus according to claim 1, further comprising a processing unit configured to bring, when the second printer object does not exist during an instruction to execute the first function, the second output selection display portion into an unusable state, and to bring, when the first printer object does not exist during an instruction to execute the second function, the first output selection display portion into an unusable state.

10. The information processing apparatus according to claim 1, wherein the first area and the second area are displayed when the device object receives a drag of a file.

11. A control method comprising:
allocating a first printer object and a second printer object to a device object for receiving, in a first area, an instruction to execute a first function and for receiving, in a second area, an instruction to execute a second function;
issuing, when the instruction to execute the first function is received from a user and the first printer object exists, an instruction to perform output using a driver allocated to the first printer object, and issuing, when the instruction to execute the second function is received from the user and the second printer object exists, an instruction to perform output using a driver allocated to the second printer object; and
deleting the device object when the first printer object and the second printer object do not exist,
wherein the first area and the second area are concurrently displayed.

12. The control method according to claim 11, wherein the first function is a function of performing printing using an image processing apparatus, the second function is a function of performing facsimile transmission using the image processing apparatus, the first printer object is a printer object for printing, and the second printer object is a printer object for facsimile transmission.

13. The control method according to claim 11, wherein the device object is an object for receiving a drop of a file from the user, and
wherein the control method further comprises issuing, when the instruction to execute the first function is received from the user by the drop of the file and the first printer object exists, the instruction to perform output based on the file using the driver allocated to the first printer object, and issuing, when the instruction to execute the second function is received from the user by the drop of the file and the second printer object exists, the instruction to perform output based on the file using the driver allocated to the second printer object.

14. The control method according to claim 11, further comprising displaying, when the first printer object and the second printer object do not exist when a virtual device application serving as an application for displaying the device object is started, a confirmation screen for confirming whether the device object is to be deleted, and
deleting the device object when the instruction to delete the device object is received from the user via the confirmation screen for confirming whether the device object is to be deleted.

15. The control method according to claim 11, further comprising displaying, when the instruction to execute the first function is received from the user and the first printer object does not exist or when the instruction to execute the second function is received from the user and the second printer object does not exist, a setting screen for receiving an instruction to change the printer object allocated to the device object from the user.

16. The control method according to claim 11, further comprising deleting, when the instruction to execute the first function or the instruction to execute the second function is received from the user and the first printer object and the second printer object do not exist, the device object.

17. The control method according to claim 11, further comprising displaying a first output selection display portion serving as a display area for executing the first function and a second output selection display portion serving as a display area for executing the second function, displaying the first output selection display portion as an unusable state when the first printer object does not exist, and displaying the second output selection display portion as an unusable state when the second printer object does not exist.

18. The control method according to claim 11, further comprising displaying, when the instruction to execute the first function is received from the user and the first printer object does not exist or when the instruction to execute the second function is received from the user and the second printer object does not exist, a confirmation screen for confirming whether a setting screen is to be displayed, and displaying, when the instruction to display the setting screen is received from the user via the confirmation screen, the setting screen.

19. The control method according to claim 11, further comprising bringing, when the second printer object does not exist during an instruction to execute the first function, the second output selection display portion into an unusable state, and bringing, when the first printer object does not exist during an instruction to execute the second function, the first output selection display portion into an unusable state.

20. The control method according to claim 11, wherein the first area and the second area are displayed when the device object receives a drag of a file.

21. A computer-readable non-transitory storage medium storing a program that causes a computer to execute a method comprising:
  allocating a first printer object and a second printer object to a device object for receiving, in a first area, an instruction to execute a first function and for receiving, in a second area, an instruction to execute a second function;
  issuing, when the instruction to execute the first function is received from a user and the first printer object exists, an instruction to perform output using a driver allocated to the first printer object, and issuing, when the instruction to execute the second function is received from the user and the second printer object exists, an instruction to perform output using a driver allocated to the second printer object; and
  deleting the device object when the first printer object and the second printer object do not exist,
  wherein the first area and the second area are concurrently displayed.

22. The computer-readable non-transitory storage medium according to claim 21, wherein the first area and the second area are displayed when the device object receives a drag of a file.

* * * * *